(12) United States Patent
Jacobsen et al.

(10) Patent No.: US 9,122,307 B2
(45) Date of Patent: Sep. 1, 2015

(54) ADVANCED REMOTE CONTROL OF HOST APPLICATION USING MOTION AND VOICE COMMANDS

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 13/234,916

(22) Filed: Sep. 16, 2011

(65) Prior Publication Data

US 2012/0236025 A1    Sep. 20, 2012

Related U.S. Application Data

(60) Provisional application No. 61/384,586, filed on Sep. 20, 2010.

(51) Int. Cl.
| | | |
|---|---|---|
| *G09G 5/377* | (2006.01) | |
| *G06F 3/01* | (2006.01) | |
| *G06T 11/60* | (2006.01) | |
| *G06F 3/16* | (2006.01) | |

(52) U.S. Cl.
CPC ............. *G06F 3/013* (2013.01); *G06F 3/011* (2013.01); *G06F 3/012* (2013.01); *G06F 3/017* (2013.01); *G06T 11/60* (2013.01); *G06F 3/167* (2013.01)

(58) Field of Classification Search
CPC ... G09G 5/377; G09G 2340/12; G06F 1/1694
USPC ............................................. 709/217; 345/8
See application file for complete search history.

(56) References Cited

U.S. PATENT DOCUMENTS

| | | | |
|---|---|---|---|
| 5,005,213 A | 4/1991 | Hanson et al. | |
| 5,594,469 A * | 1/1997 | Freeman et al. | ............... 345/158 |
| 6,084,556 A | 7/2000 | Zwern | |
| 6,198,462 B1 | 3/2001 | Daily et al. | |
| 6,313,864 B1 | 11/2001 | Tabata et al. | |
| 6,369,952 B1 | 4/2002 | Rallison et al. | |
| 6,408,257 B1 | 6/2002 | Harrington et al. | |
| 6,538,676 B1 | 3/2003 | Peters | |

(Continued)

FOREIGN PATENT DOCUMENTS

| | | |
|---|---|---|
| WO | WO 2010/129679 A1 | 11/2010 |
| WO | WO 2011/097226 A1 | 8/2011 |

(Continued)

OTHER PUBLICATIONS

Notification of Transmittal of International Search Report and Written Opinion of PCT/US2012/068686, Date of Mailing: Mar. 25, 2013, 11 pages.

(Continued)

*Primary Examiner* — Phi Hoang
(74) *Attorney, Agent, or Firm* — Hamilton, Brook, Smith & Reynolds, P.C.

(57) ABSTRACT

A head mounted microdisplay (HMD) device that uses hand, body, head movement or gesture and voice commands to control interaction with a local processor or host computer. The local processor overlays information, such as onto an operating system desktop or application program menu, indicating the motion, gesture, and/or voice input needed to activate an associated action.

6 Claims, 10 Drawing Sheets

(56) References Cited

U.S. PATENT DOCUMENTS

| | | | |
|---|---|---|---|
| 6,778,906 B1 | 8/2004 | Hennings et al. | |
| 7,501,995 B2 | 3/2009 | Morita et al. | |
| 8,184,983 B1 | 5/2012 | Ho et al. | |
| 8,855,719 B2 | 10/2014 | Jacobsen et al. | |
| 8,862,186 B2 | 10/2014 | Jacobsen et al. | |
| 8,929,954 B2 | 1/2015 | Jacobsen et al. | |
| 2001/0003712 A1* | 6/2001 | Roelofs | 463/37 |
| 2001/0035845 A1 | 11/2001 | Zwern | |
| 2002/0030649 A1 | 3/2002 | Zavracky et al. | |
| 2002/0044152 A1 | 4/2002 | Abbott, III et al. | |
| 2002/0154070 A1 | 10/2002 | Sato et al. | |
| 2003/0016253 A1 | 1/2003 | Aoki et al. | |
| 2003/0065805 A1 | 4/2003 | Barnes | |
| 2003/0067536 A1 | 4/2003 | Boulanger et al. | |
| 2003/0222917 A1 | 12/2003 | Trantow | |
| 2004/0113867 A1 | 6/2004 | Tomine et al. | |
| 2004/0193413 A1 | 9/2004 | Wilson et al. | |
| 2004/0210852 A1 | 10/2004 | Balakrishnan et al. | |
| 2004/0267527 A1 | 12/2004 | Creamer et al. | |
| 2005/0047629 A1 | 3/2005 | Farrell et al. | |
| 2005/0108643 A1 | 5/2005 | Schybergson et al. | |
| 2005/0114140 A1 | 5/2005 | Brackett et al. | |
| 2005/0237296 A1 | 10/2005 | Lee | |
| 2005/0245292 A1 | 11/2005 | Bennett et al. | |
| 2006/0010368 A1 | 1/2006 | Kashi | |
| 2006/0028400 A1* | 2/2006 | Lapstun et al. | 345/8 |
| 2006/0061551 A1 | 3/2006 | Fateh | |
| 2006/0109237 A1 | 5/2006 | Morita et al. | |
| 2006/0178085 A1 | 8/2006 | Sotereanos et al. | |
| 2006/0221266 A1 | 10/2006 | Kato et al. | |
| 2007/0009125 A1 | 1/2007 | Frerking et al. | |
| 2007/0030174 A1 | 2/2007 | Randazzo et al. | |
| 2007/0103388 A1 | 5/2007 | Spitzer | |
| 2007/0180979 A1 | 8/2007 | Rosenberg | |
| 2007/0220108 A1* | 9/2007 | Whitaker | 709/217 |
| 2007/0265495 A1 | 11/2007 | Vayser | |
| 2008/0055194 A1 | 3/2008 | Baudino et al. | |
| 2008/0084992 A1 | 4/2008 | Peddireddy et al. | |
| 2008/0120141 A1 | 5/2008 | Kariathungal et al. | |
| 2008/0144854 A1 | 6/2008 | Abreu | |
| 2008/0180640 A1 | 7/2008 | Ito | |
| 2008/0200774 A1 | 8/2008 | Luo | |
| 2008/0201634 A1 | 8/2008 | Gibb et al. | |
| 2008/0211768 A1 | 9/2008 | Breen et al. | |
| 2008/0239080 A1 | 10/2008 | Moscato | |
| 2009/0002640 A1 | 1/2009 | Yang et al. | |
| 2009/0079839 A1 | 3/2009 | Fischer et al. | |
| 2009/0093304 A1 | 4/2009 | Ohta | |
| 2009/0099836 A1 | 4/2009 | Jacobsen et al. | |
| 2009/0117890 A1 | 5/2009 | Jacobsen et al. | |
| 2009/0182562 A1 | 7/2009 | Caire et al. | |
| 2009/0204410 A1 | 8/2009 | Mozer et al. | |
| 2009/0251409 A1 | 10/2009 | Parkinson et al. | |
| 2010/0117930 A1 | 5/2010 | Bacabara et al. | |
| 2010/0119052 A1 | 5/2010 | Kambli | |
| 2010/0128626 A1 | 5/2010 | Anderson et al. | |
| 2010/0141554 A1 | 6/2010 | Devereaux et al. | |
| 2010/0156812 A1* | 6/2010 | Stallings et al. | 345/173 |
| 2010/0164990 A1 | 7/2010 | Van Doorn | |
| 2010/0182137 A1* | 7/2010 | Pryor | 340/425.5 |
| 2010/0225734 A1 | 9/2010 | Weller et al. | |
| 2010/0245585 A1 | 9/2010 | Fisher et al. | |
| 2010/0302137 A1* | 12/2010 | Benko et al. | 345/156 |
| 2010/0309295 A1 | 12/2010 | Chow | |
| 2011/0001699 A1 | 1/2011 | Jacobsen et al. | |
| 2011/0092825 A1 | 4/2011 | Gopinathan et al. | |
| 2011/0134910 A1 | 6/2011 | Chao-Suren et al. | |
| 2011/0187640 A1 | 8/2011 | Jacobsen et al. | |
| 2011/0221656 A1 | 9/2011 | Haddick et al. | |
| 2012/0068914 A1 | 3/2012 | Jacobsen et al. | |
| 2012/0075177 A1 | 3/2012 | Jacobsen et al. | |
| 2012/0089392 A1 | 4/2012 | Larco et al. | |
| 2012/0110456 A1 | 5/2012 | Larco et al. | |
| 2012/0236025 A1 | 9/2012 | Jacobsen et al. | |
| 2012/0287284 A1 | 11/2012 | Jacobsen et al. | |
| 2013/0174205 A1 | 7/2013 | Jacobsen et al. | |
| 2013/0231937 A1 | 9/2013 | Woodall et al. | |
| 2013/0239000 A1 | 9/2013 | Parkinson et al. | |
| 2013/0289971 A1 | 10/2013 | Parkinson | |
| 2013/0300649 A1 | 11/2013 | Parkinson et al. | |
| 2014/0111427 A1 | 4/2014 | Lindley et al. | |
| 2014/0235169 A1 | 8/2014 | Parkinson et al. | |
| 2014/0368412 A1 | 12/2014 | Jacobsen, et al. | |
| 2015/0072672 A1 | 3/2015 | Jacobsen et al. | |

FOREIGN PATENT DOCUMENTS

| | | | |
|---|---|---|---|
| WO | WO 2011/114149 A1 | 9/2011 | |
| WO | WO 2012/040107 A1 | 3/2012 | |
| WO | WO 2012/154938 A1 | 11/2012 | |

OTHER PUBLICATIONS

International Preliminary Report on Patentability and Written Opinion, PCT/US2011/023337, mailing date Aug. 16, 2012, 8 pages.

International Search Report and Written Opinion of PCT/US2011/052164 dated Jan. 17, 2012.

Notification of Transmittal of International Search Report and Written Opinion of PCT/US2012/037284 dated Oct. 1, 2012.

Notification of Transmittal of the International Search Report and Written Opinion for PCT/US2013/041349 "Head-Worn Computer With Improved Virtual Display Function" dated Aug. 9, 2013.

Notification of Transmittal of the International Search Report and Written Opinion for PCT/US2013/041070 "Controlled Headset Computer Displays" dated Oct. 18, 2013.

Notification Concerning Transmittal of International Preliminary Report on Patentability of PCT/US2001/052164, Date of Mailing: Apr. 4, 2013, 6 pages.

Notification of Transmittal of the International Search Report and Written Opinion for PCT/US2013/078051, "Lifeboard-Series of Home Pages for Head Mounted Displays (HMD) That Respond to Head Tracking", dated Apr. 22, 2014.

European Search Report for EP 12782481.1 dated Sep. 29, 2014.

EP 12782481.1, Supplemental European Search Report, "Context Sensitive Overlays in Voice Controlled Headset Computer Displays," dated Sep. 29, 2014.

International Search Report and Written Opinion for PCT/US2013/065927 dated Mar. 21, 2014, entitled, "Improved Headset Computer Operation Using Vehicle Sensor Feedback for Remote Control Vehicle".

Morphew, M.E., et al., "Helmet Mounted Displays for Unmanned Aerial Vehicle Control", Proceedings of SPIE, vol. 5442, Oct. 20, 2004.

Notification Concerning Transmittal of International Preliminary Report on Patentability of PCT/US2012/037284, "Headset Computer That Uses Motion and Voices to Control Information Display and Remote Devices", Date of Mailing: Nov. 21, 2013, 7 pages.

\* cited by examiner

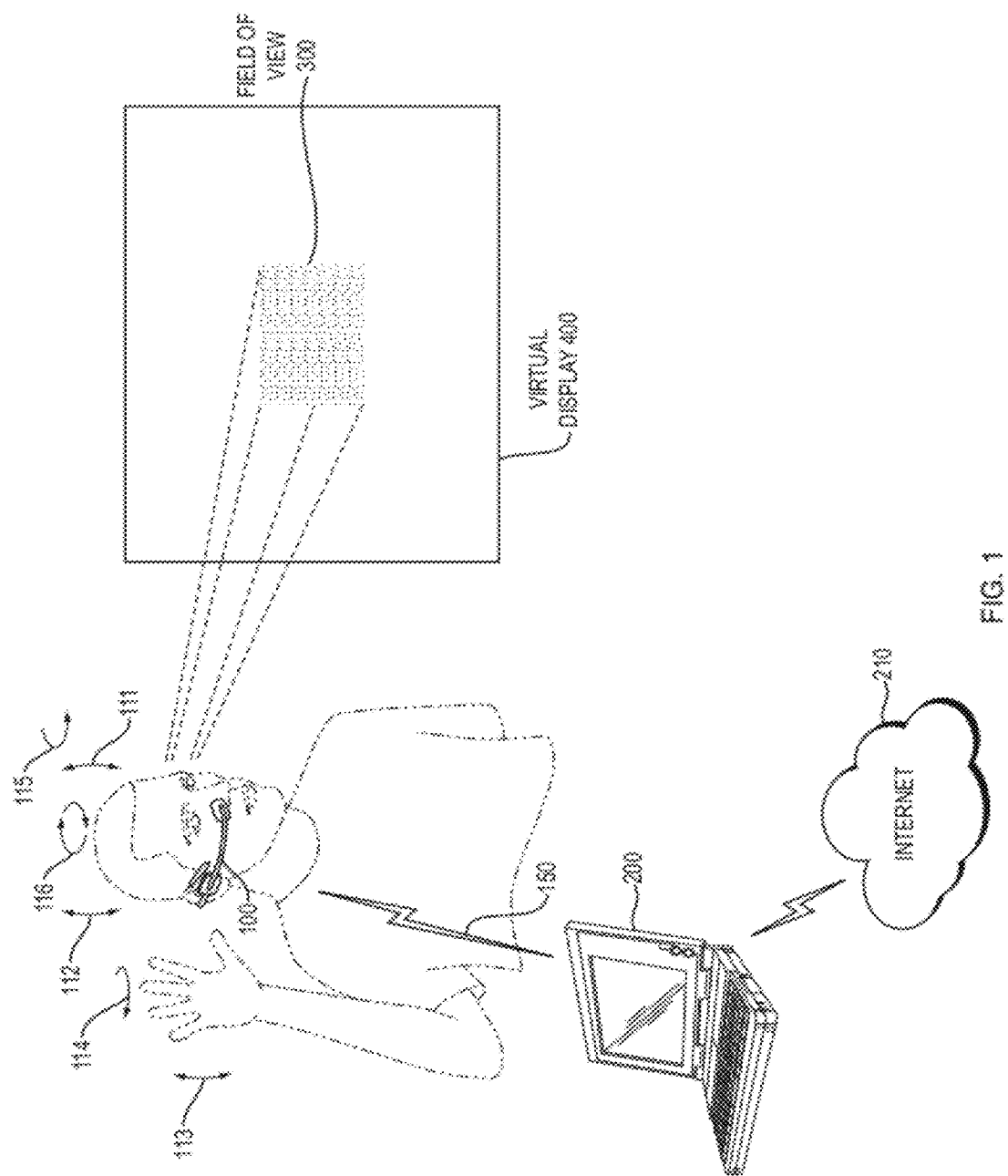

| ICON | OVERLAY TEXT | INPUT | ACTION |
|---|---|---|---|
| EXCEL | "SAY EXCEL" | "EXCEL" SPOKEN | RUN EXCEL |
| WORD | "SAY WORD" | "WORD" SPOKEN | RUN WORD |
| OUTLOOK | "SAY OUTLOOK" | "OUTLOOK" SPOKEN | RUN OUTLOOK |
| ACROBAT | "WAVE LEFT" | HAND GESTURE WAFE LEFT | RUN ACROBAT |
| FOLDER LABELED "NEW FOLDER" | "TILT + WAVE" | HEAD TILT BACK + HAND WAVE | OPEN "NEW FOLDER" |
| ⋮ | ⋮ | ⋮ | ⋮ |
| | | "CLOSE WINDOW" SPOKEN | CLOSE ACTIVE WINDOW |
| | | HEAD MOVES UP | SCROLL UP |
| | | HAND SWIPE GESTURE | SELECT NEXT DESKTOP |

FIG. 7

ADVANCED REMOTE CONTROL OF HOST APPLICATION USING MOTION AND VOICE COMMANDS

RELATED APPLICATION

This application claims the benefit of U.S. Provisional Application No. 61/384,586, filed on Sep. 20, 2010. The entire teachings of the above application(s) are incorporated herein by reference.

BACKGROUND

The present application relates to human/computer interfaces and more particularly to a device that accepts voice commands and tracks hand gestures and/or head movements to provide inputs to software such as executing locally or on a remote host computer.

Small, portable electronic devices capable of storing and displaying large amounts of high resolution, computer graphic information and even video content continue to be increasingly popular. These smart phone devices, such as the Apple iPhone™, and Google Android™ phones represent a significant trend towards convergence among mobile phones, portable computers and digital media players. (iPhone is a trademark of Apple Computer, Inc. of Cupertino, Calif.; Android is a trademark of Google, Inc. of Mountain View, Calif.) While these devices typically include a display screen, the visual experience of a high resolution, large format display cannot be easily replicated in such devices because of their physical size limitations.

As a result, consumers are now seeking a high quality, portable, color display to augment their handheld devices. One such device is a head mounted eyewear device which is worn about the user's face or head similar to a pair of eyeglasses or headphones. These devices include a small high resolution microdisplay and lens to magnify the image. A wireless interface provides great convenience and mobility to such devices. The microdisplay can provide Super Video Graphics Array (SVGA) (800×600) resolution or even Extended Graphics Array (XGA) (1024×768) or higher resolution. For more information regarding such displays, see a co-pending patent application entitled "Mobile Wireless Display Software Platform for Controlling Other Systems and Devices", U.S. application Ser. No. 12/348,648 filed Jan. 5, 2009 and "Handheld Wireless Display Devices Having High Resolution Display Suitable for Use as Mobile Internet Device", PCT International Application No. PCT/US09/38601 filed Mar. 27, 2009, the entire contents of each of which are hereby incorporated by reference.

SUMMARY OF THE DISCLOSURE

A portable personal computer has a microdisplay, an input device such as a head tracking accelerometer, gyro(s), or a camera to detect movements such as head movements, hand motions and/or gestures, and audio processing circuits to detect voice commands. These combined inputs provide control of operating system(s) and/or application(s) running on the device itself and/or on a remote host processor.

Head Mounted Display (HMD) device includes a microdisplay. In one embodiment, a for displaying visual information received from a local processor. A motion detector detects physical movement of the head and/or a body part of a user to provide a motion or gesture input. A microphone provides a audio signal interpreted as voice commands by the local processor. The local processor overlays words, graphics or other user prompts onto the microdispaly to indicate motions/gestures/vocal inputs that will activate certain commands.

The processor converts the voice, motion or gesture inputs or combination thereof, to a user command. The user command is then interpreted by an operating system or application program to change aspects of the information displayed on the microdisplay. This can include a visual or audio confirmation of the local processor having processed the user command.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 1 is a high level diagram showing a Head Mounted Display (HMD) device, and a person using hand gestures and/or head movements to control actions of a local or remote computer.

FIG. 7 is an example table kept by the service(s).

DETAILED DESCRIPTION OF PREFERRED EMBODIMENTS

Figure 2A:
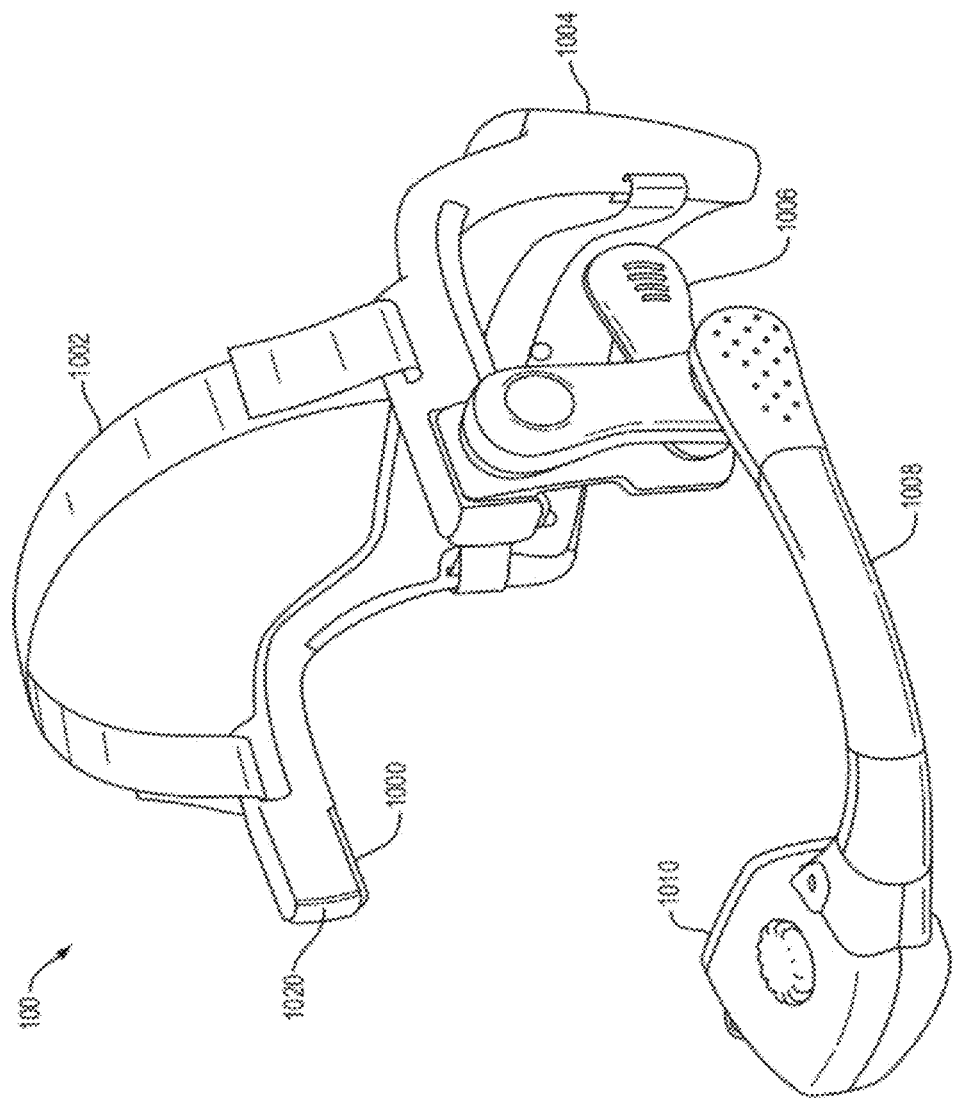
FIG. 2A is an embodiment using a head strap.

A description of example embodiments follows.

FIG. 1 shows a wireless computing Headset Mounted Device (HMD) 100 (also referred to as a video eyewear device 100) that incorporates a high resolution (VGA or better) microdisplay element and other features described below. HMD device 100 typically includes many different types of integrated circuits including a microcomputer (single or multi-core), one or more wireless interfaces, associated memory or other storage devices, one or more cameras (optical sensors) and/or various sensors. These sensors may include audio input and/or output devices, such as one or more microphone(s) input and output speaker(s) the sensors may include geo-positional sensing, 3 axis to 9 axis degrees of freedom orientational sensors (such as a digital magnetometer), atmospheric sensors, health condition sensors, GPS, digital compass, pressure sensors, environmental sensors, energy sensors, acceleration, position, attitude, motion, velocity or optical sensors, cameras (visible, infrared, etc.). Further circuits such as additional wireless radios, auxiliary lighting, range finders, or the like, and/or an array of sensors may be embedded in and/or attached to the device. Also typically located within the HMD 100 are a peripheral mount or mounts such as a "hot shoe" (not shown in FIG. 1) for mounting optional accessories such as cameras or additional sensors. The camera(s), motion sensor(s) and/or sensor(s) are used to track the motion and/or position of the user's head, hands and/or body in at least a first axis 111 (horizontal), but preferably also a second (vertical) 112, a third (depth) 113, a fourth (pitch) 114, a fifth (roll) 115 and a sixth (yaw) 116.

The device 100 can be used in various ways. It can be used as a completely contained, head-mounted fully functional portable personal computer/smart phone with full connectivity to external computers and networks through a short and/or long-range wireless links 150 such as Bluetooth, WiFi, cellular, LTE, WiMax or other wireless radios.

Device 100 can be also used as a remote display for a streaming video signal provided by a remote host computer 200. The host 200 may be, for example, a laptop, cell phone, Blackberry, iPhone™, or other computing device having lesser or greater computational complexity than the video eyewear device 100 itself. The host 200 then provides information to the device 100 to be displayed. The device 100 and host 200 are connected via one or more suitable wireless connections such as provided by the Bluetooth WiFi, cellular, LTE, WiMax or other wireless radio link 150. The host 200 may itself be further connected to other networks such as through a wired or wireless connection to the Internet 210.

The device 100 can also be used as a remote control for the host 200.

The various audio input devices and motion sensors and/or camera(s) incorporated into HMD 100 can allow a user to select a field of view 300 within a much larger area defined by a virtual display 400 provided by a processor local to the device 100 and/or by a processor inside host 200. For example, the user can typically control the position, extent (e.g., X-Y or 3D range), and/or magnification of the field of view 300 of the much larger virtual display area 400 using head movements or hand movements or body gestures or in other ways, such as with voice inputs. The wireless computing headset device 100 thus can respond to inputs from these peripherals, and process them to, for example, pan, zoom change the field of view 300, and control other aspects of the virtual display 400, such as the position, extent (e.g., X-Y or 3D range), and/or magnification of the field of view 300.

As will be more fully explained below, the voice, motion, and gesture inputs can also control further aspects of presentation of information on the microdisplay, or even which information is displayed.

While what is shown in FIG. 1 is a monocular microdisplay presenting a single fixed display element supported on the face of the user with a cantilevered boom, it should be understood that other mechanical configurations for various video eyewear devices 100 are possible.

FIG. 2 is a perspective view showing more detail of an HMD device 100. The device 100, includes generally a frame 1000, a strap 1002, at back section 1004, speaker 1006, cantilever or arm 1008, and microdisplay subassembly 1010. On one side of the device 100 opposite the cantilever arm 1008 is a peripheral port 1020. The peripheral port 1020 provides corresponding connections to one or more peripheral devices, so a user can removably attach various accessories to the device 100. An example port 1020 provides a mechanical and electrical accessory mount such as a hot shoe. Wiring carries electrical signals from port 1020 through, for example, the back portion 1004 to circuitry disposed therein. Hot shoe 1020 can operate much like the hot shoe on a camera, automatically providing connections to power the accessory and carry signals to and from the rest of device 100 peripheral speaker 1031. Various types of accessories can thus be used with port 1020 to provide the hand movements, head movements, and or vocal inputs to the system, such as but not limited to microphones, positional, orientation and other previously described sensors, cameras, and the like.

Figure 2B:
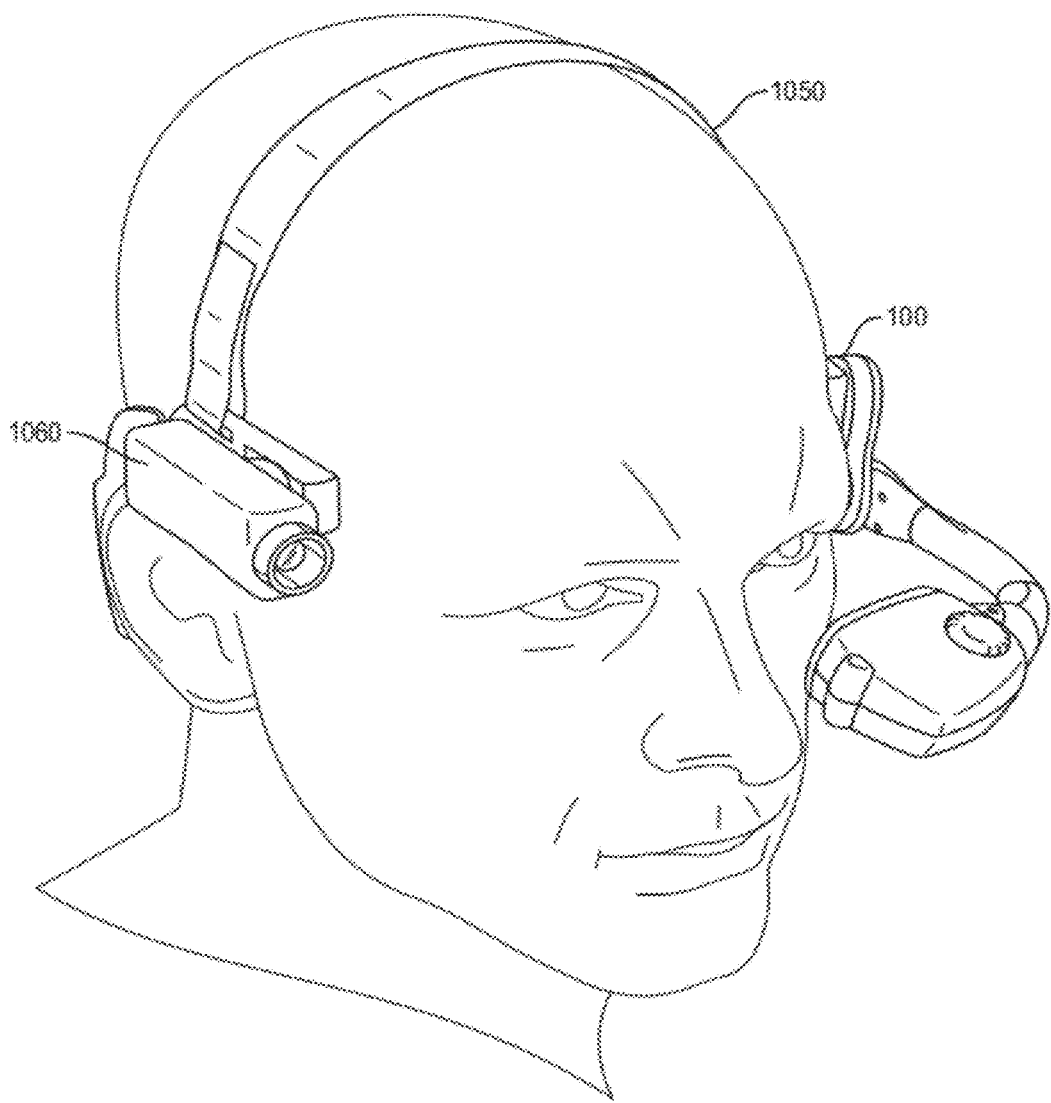
FIG. 2B shows an optional camera element.

FIG. 2B is a view of the HMD device 100 as worn on the head of a user where an accessory 1060 has been placed in the hot shoe port 1020. This accessory 1060 is a self-contained camera (or other motion sensor) assembly. The camera 1060 can include both audio and video sensing and recording capabilities in a package similar to a "bullet cam". It can be connected to the remaining components in device 100 via built in wiring in the back section 1004 (as in the case of the speaker previously described) or can be wirelessly connected via a Bluetooth™ or WiFi™ connection. The camera 1060 may not necessarily be a video camera, but may also detect infrared, ultraviolet, or other wavelengths. The camera 1060 can also include a user adjustable auxiliary light source. With the light source, the camera 1060 can also be used as a flashlight as desired without activating the camera portion.

The camera, motion tracking and audio inputs to the device 100 are interpreted as user commands in various ways to control operation of the local processor, the microdisplay, or the external host 200.

Head movement tracking and/or vocal commands can also be provided by the user 1050 to manipulate the settings of camera 1060. For example, a user vocal command, such as "zoom" or "pan", can be recognized by the local processor and cause the camera 1060 to zoom in or telephoto out.

The camera 1060 may also have a built in image stabilization system and/or a movement tracking solution by leveraging the 3 axis up to 9 axis degree of freedom position sensors so that software in the device 100 or attached peripheral device can correct an incoming video feed for small, vibrations, head movements or small camera movements, especially when the camera image is magnified, via the movements detected. In this configuration, the device 100 can also operate at a higher frame rate than what is actually being captured by camera 1060 alone. Numerous applications exist for such a camera 1060 peripheral. For example, it can be placed on the head of an elderly person and then device 100 can recognize and correct vibrations in their head movements, due to natural human stability tremors which typically increase with age. This can help with accuracy of cursor movement when the user is viewing the microdisplay on device 100, or correct motions when device 100 is used when riding in a moving vehicle or conveyance over a rough surface, in rough weather or in a harsh environment, such an unpaved road, to correct the view on the display 1010 for vibration, and again provide better control of cursor movement.

Figure 3:
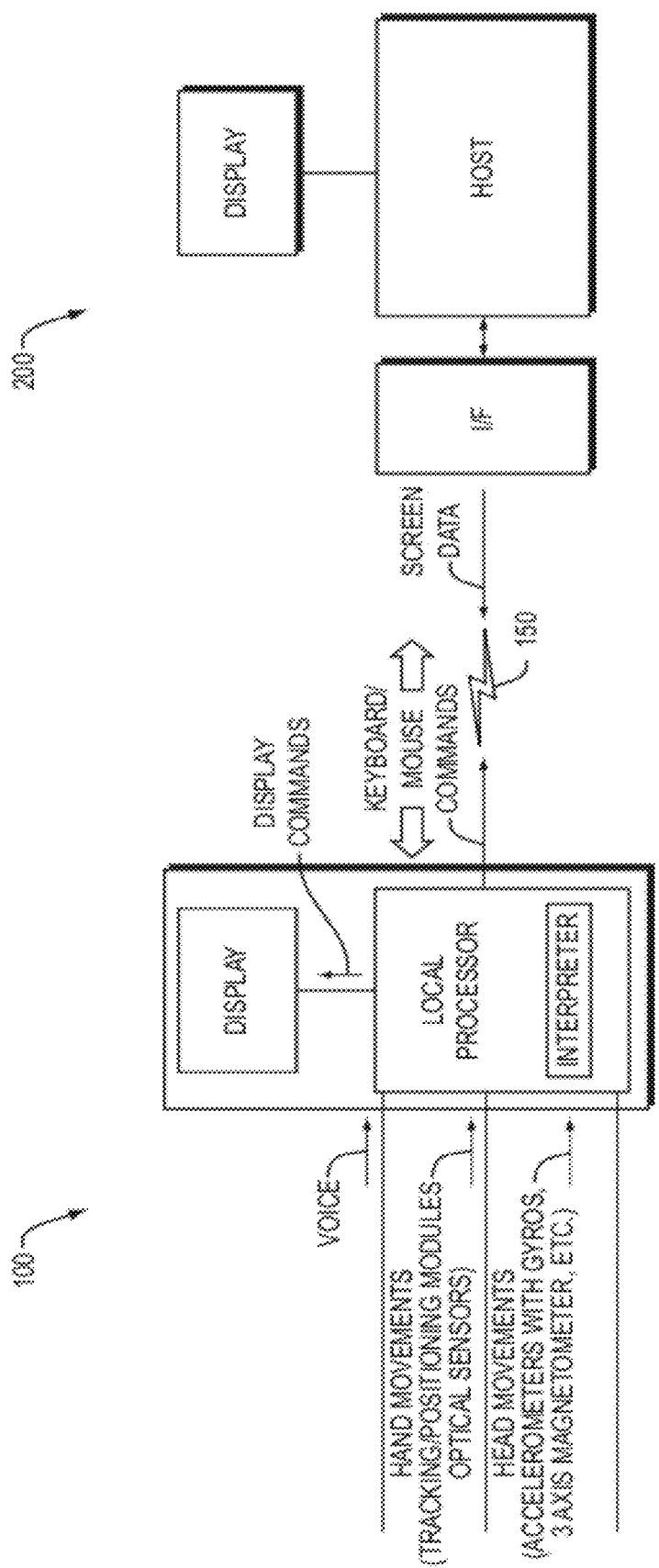
FIG. 3 is a high level block diagram of the device and optional connections to a host illustrating how voice, hand gesture and head motion tracking commands are translated.

FIG. 3 is a block diagram showing more detail of the HMD 100, optional host 200 and the data that travels between them. The HMD 100 receives audio signals input via the microphone, hand movements or body gestures via positional and orientation sensors, the camera or optical sensor(s), and head movement inputs via the head tracking circuitry such 3 axis to 9 axis degree of freedom orientation sensors. These are translated by software in a processor local to the device 100 into keyboard and/or mouse commands. These commands may then be interpreted by a processor internal to the HMD 100 to control aspects of the presentation of information on the microdisplay. The commands may also be sent over the Bluetooth or other wireless interface 150 to the host 200. The host 200 then interprets these translated commands in accordance with its own operating system/application software to perform various functions, and or returns information to the device 100.

Among the commands that can be carried out on the local processor and/or the remote host 200 is one to select a field of view 300 within the virtual display. Thus, it should be understood that a very large format virtual display area might be associated with operating system or application software running on the HMD 100 or on the host 200. However, only a portion of that large virtual display area within the field of view 300 is returned to and actually displayed by the remote control display device 100 as selected by the voice, hand gestures, or head motion commands.

For example, the virtual display area may include a detailed map of the United States. A user may initially see the entire United States area on the microdisplay, albeit at reduced resolution. The field of view might be initially centered at a low magnification on a central location, such as at Lawrence, Kans. The user then moves his head or makes a hand gesture to view an area of specific interest in some detail such as Seattle, Wash. The hand gesture may be a diagonal sweeping motion. The head movement may be to the left and then up or may be a straight diagonal movement over to the new area of interest. With a corresponding vocal command such as "zoom in", the presented virtual display area is then zoomed in to see the area around Seattle in more detail on the microdisplay.

Figure 4:
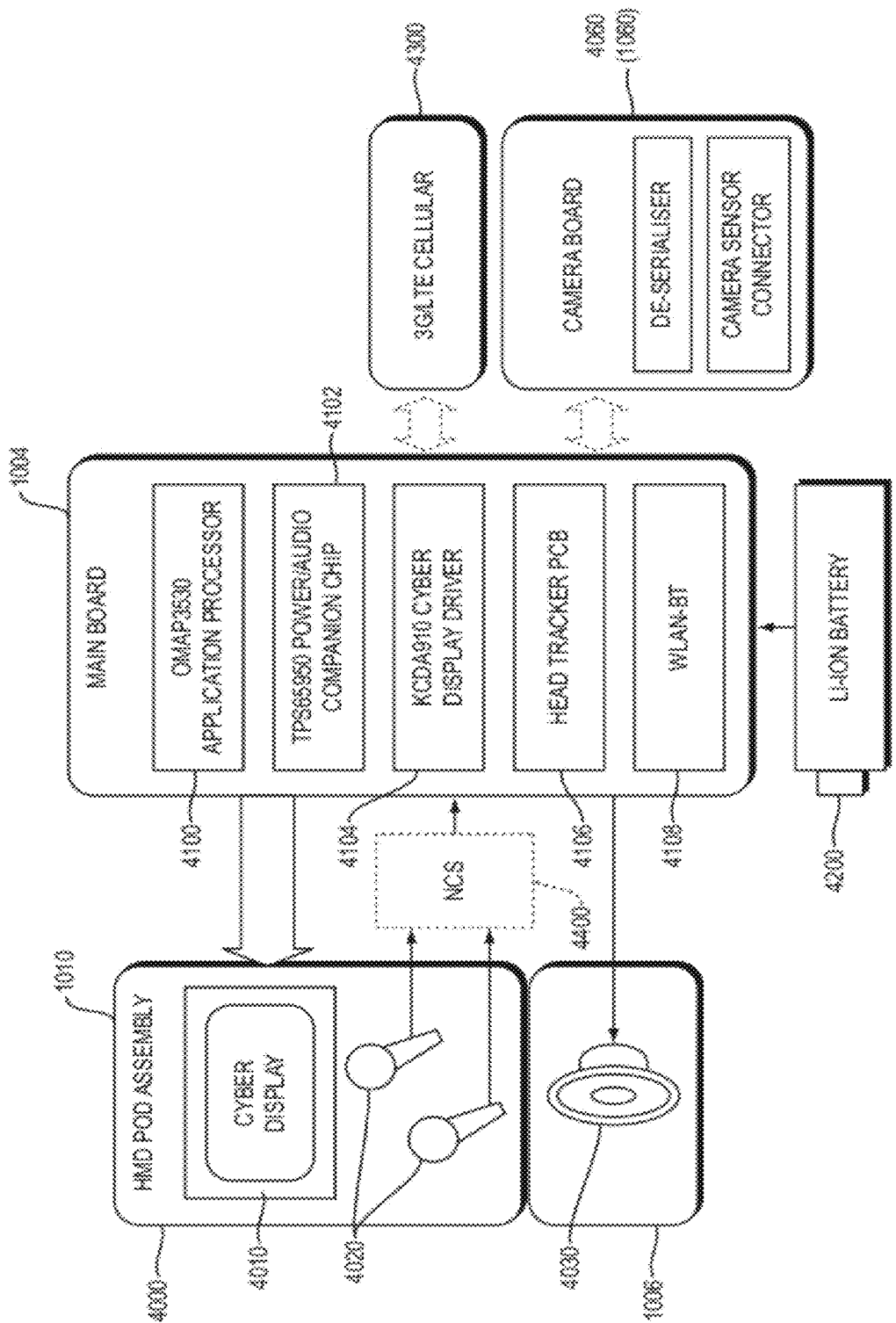
FIG. 4 is a more detailed diagram of the components of the HMD device.

FIG. 4 is a simplified high level block diagram of a non-limiting example embodiment of the HMD system 100. The system electronics can be placed on or in the frame in an appropriate location (such as back section 1004) and include an Open Media Application Platform (OMAP) as the local processor 4110, a power/audio companion chip 4102, a display driver 4104, a head tracker circuit board 4106, and wireless LAN/Bluetooth interface 4108. Also located in the housing is a power source, such as a lithium ion battery 4200.

The HMD device 100 may also include an eye pod assembly 4000 that includes the aforementioned microdisplay 4010 (e.g. the microdisplay 1010 and boom 1008 of FIG. 2A), and one or more microphones 4020. One or more speakers 4030 are positioned in the HMD housing earpiece near the user's ear (item 1006 in FIG. 2A). The head tracker circuitry 4106 may include circuits to determine head movements and gestures detected by sensors in the device 100, such as lateral movements along and rotation gestures around the X, Y and Z axes using Hall effect sensors, MIM diodes, accelerometers, gyros and/or transducers or other sensors as mentioned above.

HMD system 100 may also receive inputs from external input devices such as a wireless mouse, track ball, or keyboard that may be wirelessly connected through the Bluetooth interface 4108.

Software in the WLAN/BT front end 4108, the OMAP 4100 and/or host 200 may be used to interpret hand gestures detected by the camera or other sensors. A camera board 4060 may optionally provide video input, as well.

The OMAP processor 4100 may include a central processing unit, and on-chip memory such as Random Access Memory (RAM) that may include non volatile memory and/or Read Only Memory (ROM). The OMAP may be a Texas Instruments model OMAP 3530 processor or newer version sold by Texas Instruments, Inc. and using a multimedia processor. The OMAP 4100 may typically execute an embedded system such as operating a particular versions of MicroSoft Windows®. The OMAP 4100 is generally a more powerful, and more power consuming processor then the WLAN/BT interface 4108.

In this example, a TPS 65950 power/audio companion chip also available from Texas Instruments, provides audio, USB, keypad control and battery charging functions to the system.

The WLAN/BT interface 4108 may be a model LBEE 1W8 NEC-interface circuit, a Bluetooth circuit such as available from CDR, Ltd. of Cambridge, United Kingdom or other radio module with similar or greater capabilities.

The display driver may be a model KCD-A 910 display driver available from Kopin Corporation of Westborough, Mass.

The microdisplay 4010, also available from Kopin, can include models 113LV, 152LV, 230LV, WQVGA, or other manufactures accesptable micro-displays.

An NCS module 4400 processes the received microphone signals to provide voice recognition functions and produce an audio signal to the audio companion chip 4102 and from there to the OMAP processor 4100.

In one embodiment, the OMAP processor 4100 is designed to run either with a "left eye" or "right eye" orientation. If a standard configuration is to run "right eye", then when running using left-eye, the software must take into account that the display screen is now physically rotated 180 degrees. This means the software must be able to run 'upside-down' also. The screen might be able to be manually 'flipped' upside down with a spoken command or mouse click. Alternatively, a hardware signal can be generated to permit the processor to detect the screen-flipping and thereby to cause the same in software (i.e. hardware gyroscopes, accelerometers, or switches etc. . . . )

Figure 5:
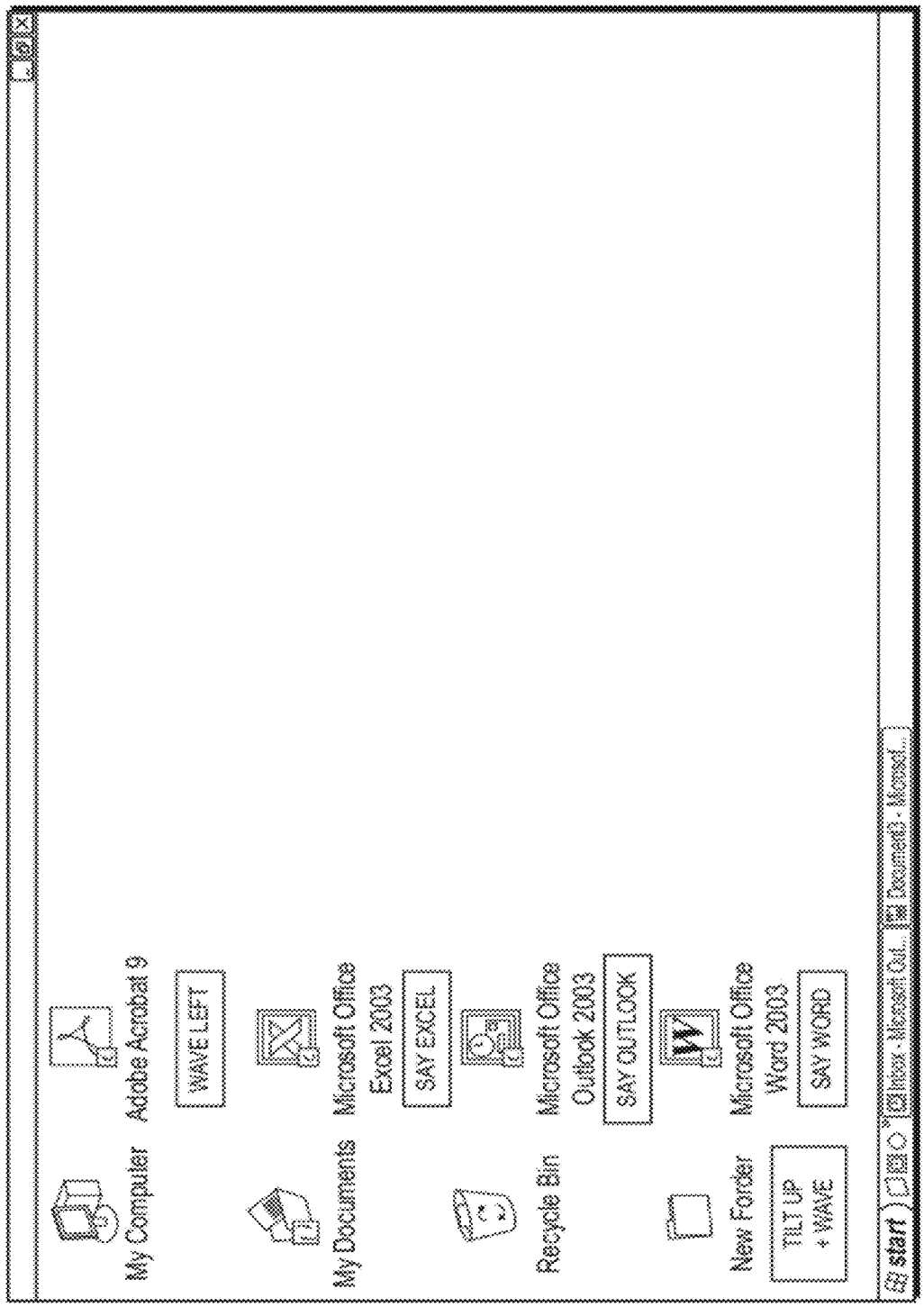
FIG. 5 is an example software overlay, such as onto a Microsoft Windows desktop, to indicate available head movement and voice commands to the user.

FIG. 5 illustrates one feature implemented as part of the HMD 100. Here, the HMD device imposes a software overlay onto the presentation of information to the user. The overly adds a graphic picture and/or text associated with a spoken command, hand gesture, or head movement needed to initiate an action indicated by icons, buttons, sliders, drop down lists, or other objects on the screen.

These overlays are shown by the text in the square blocks next to icons on the user's Windows® desktop. In this example, the overlay indicates to the user that aspoken command such as "Excel" or "Word" will therefore activate the corresponding Microsoft Office® program. A hand wave gesture will activate the Adobe Acrobat® program. And a combined head tilt up and wave gesture will open the "New" document folder. It should be understood that FIG. 5 is but one example, and that the overlays can be applied to various application programs, menus, dialog boxes, scrolling lists, operation system desktops/commands, or in other places where the system is to capture user keyboard or mouse gestures or commands.

On successful command recognition, the HMD device 100 can play an audio sample (beep) to indicate successful recognition to the user. The device 100 can also display the recognized word in the center of the screen for a short duration (1 second), again to give feedback to the user that the HMD device 100 correctly recognized what was said.

Figure 6:
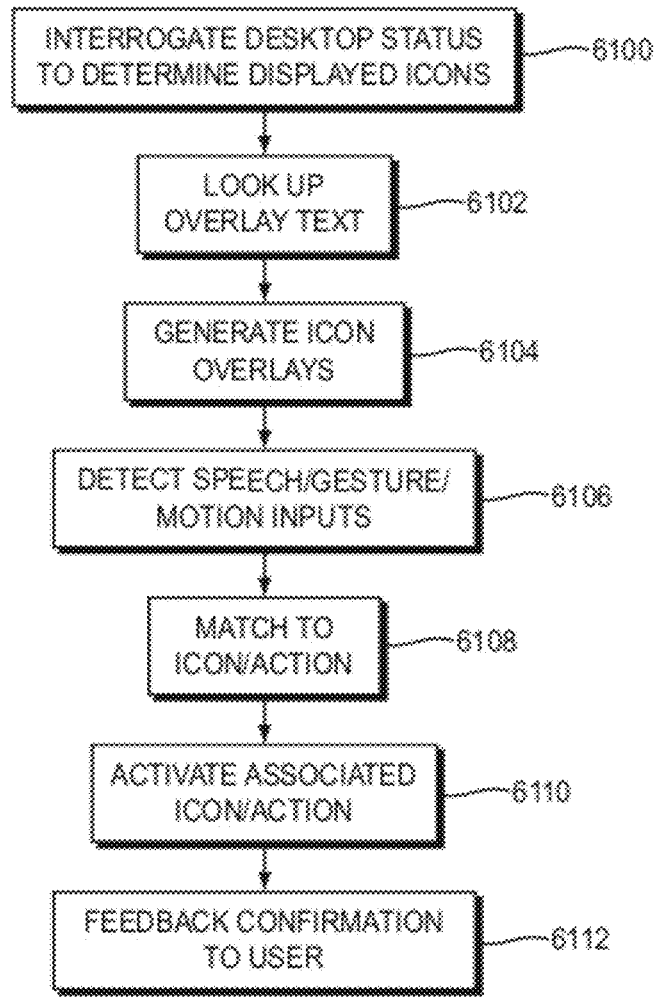
FIG. 6 is a set of functions performed by one or more operating system service(s).

Example implementation of these overlay features is now described in connection with FIG. 6 and FIG. 7. The software overlay may be implemented as a user interface service or services running under, for example a Microsoft Windows® embedded operating system executing on the OMAP processor 4100. The services provide a number of functions as listed in FIG. 6. A first step 6100 is to interrogate the status of the user's desktop to determine any icons that are displayed. Next, in 6102, overlay text associated with the displayed icons is then determined. As part of this state 6102, a table such as that shown in FIG. 7 may be consulted. The table associates an icon, as shown in the left most column, with overlay text. For any overlay text that is located, in state 6104 an icon overlay is generated on the desktop adjacent each associated icon.

In state 6106, the service(s) then wait(s) to detect any speech, gesture, or motion inputs. These detected inputs are then found in the table again in 6108. Next in 6110, an action associated with the detected input is then activated or other actions taken.

For example, if a folder labeled "New Folder" is detected on the desktop, the overlay text "tilt plus wave" is displayed next to such icon. The service(s) then wait(s) to detect a combination of a motion by the head tracker and a hand wave motion detected by the gesture detector. Once this occurs, action is then taken to open the new folder, i.e, to activate the icon on the desktop.

It should be understood that actions may be taken regardless of whether overlay text and/or icons are associated with the desktop. As shown in the table of FIG. 7, as one example, a spoken "close window" command may be detected causing an action to close the active window.

In another example, a head motion up detected by the head tracker may cause a scroll bar to scroll in the up direction.

Another action, such as a hand swipe, may cause the selection of the next desktop in a series of desktops.

With similar actions taken and programming of the table of FIG. 7, other features can be implemented. One feature is to assist the user after a menu command is completed. After the user inputs a menu command via head motion, hand gesture and/or spoken word(s), the overly menu may then disappear allowing a viewing of the underlying information once again. Alternatively, these "pop-up" window elements can have an auto-close feature. This means that all such windows will close themselves after a certain duration (ie. 10 seconds etc.) if the user has not selected any command in the window. In this way, where a user would otherwise normally click 'Close', 'OK', or 'Cancel' on dialog boxes with a mouse, the need for further input is removed. Manual closing of a window is still available using a mouse or speech input to say 'Close' OK' etc. In some embodiments, to aid the user, the auto-close windows can show a timer-countdown to indicate how long before the window will auto close.

Figure 8:
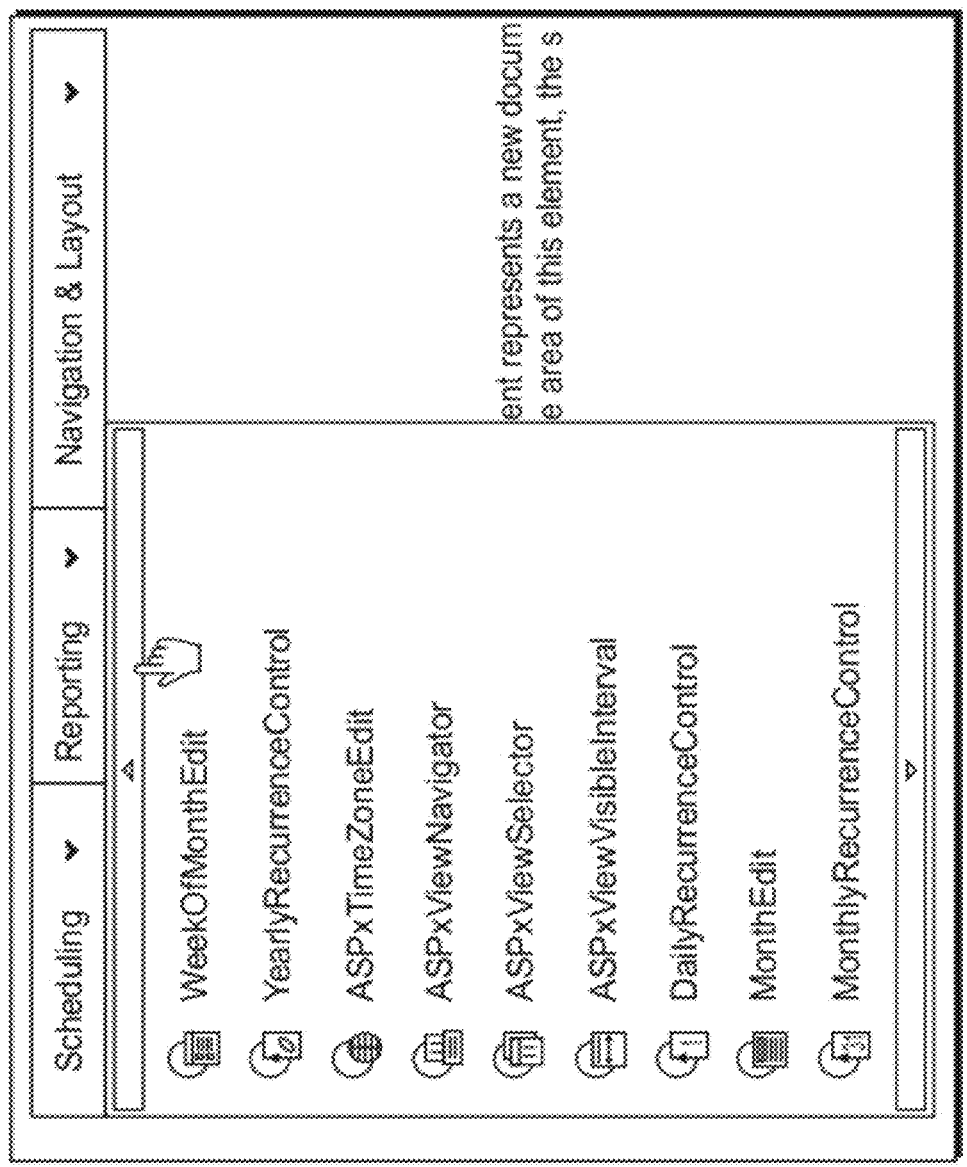
FIG. 8 is an example scrolling list.

The head motion tracking and hand gesture inputs can also control other features such as scrolling lists. Many user interface elements utilitize the notion of scrolling lists, that is lists of selectable items larger than the screen or user interface element itself. One example of such a scrolling list is shown in FIG. 8 where from a database application the user is being asked to select a certain field to be edited. However there are many other examples such as drop down menus, media playlists (such as in Apple® iTunes®) and the like where this feature can help. These lists of items are usually scrolled up and down (or left/right) using a scroll bar, mouse movement or touch pad or touch-screen 'swipe' gesture in a typical laptop computer. Here, however, one can use the head-tracking inputs of the HMD device 100 to operate these user interface elements: for example, a move head left/right or up/down can cause scrolling through the list or selecting other lists. These movements can be combined with a following spoken command to select an item in the list (e.g., "Click" or "Select").

Figure 9:
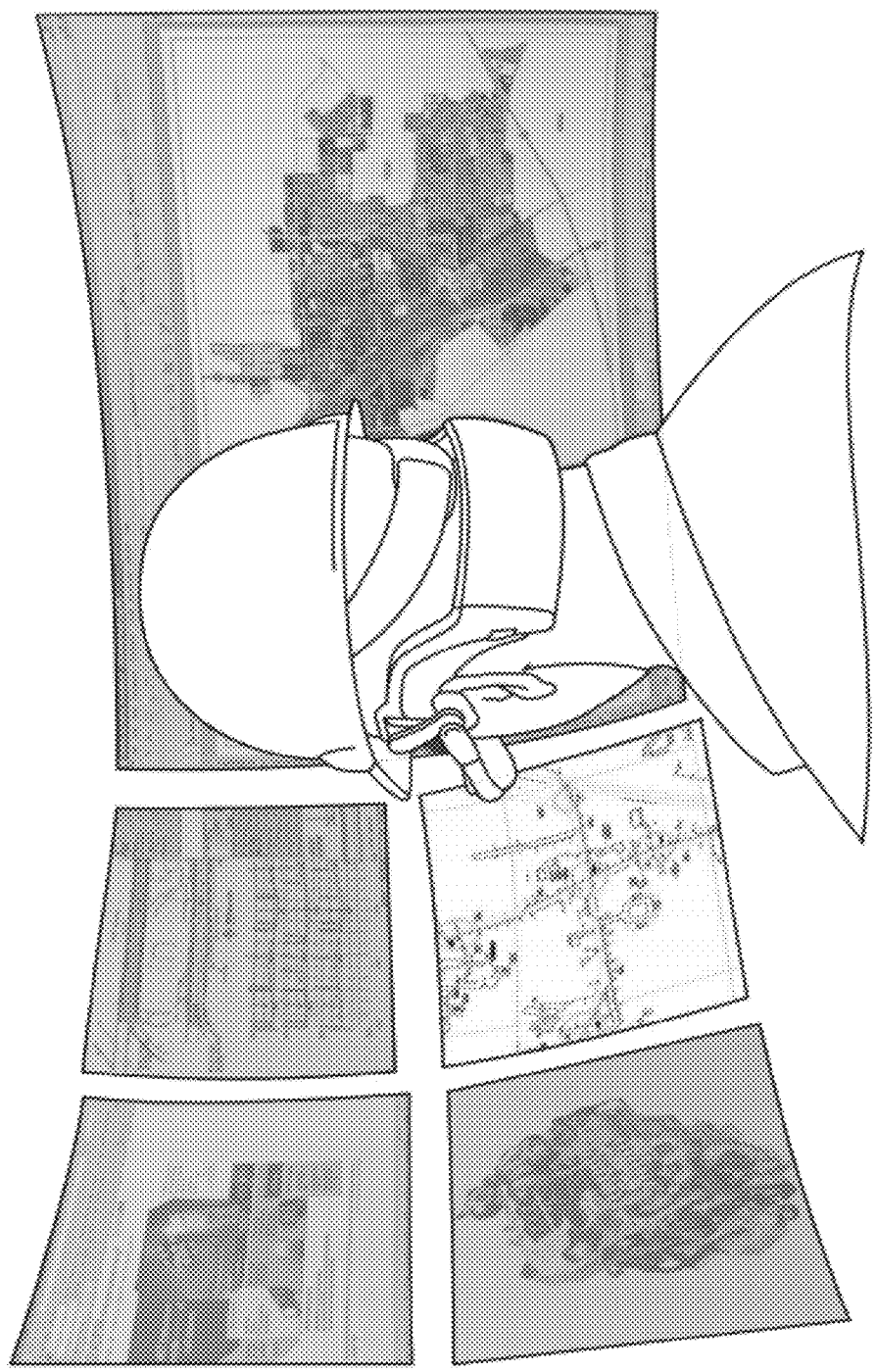
FIG. 9 shows a user selecting from multiple desktops with head motion and voice inputs.

FIG. 9 illustrates another implementation for how the head tracking and/or voice inputs can be used to operate multiple desktops and/or running-applications. Here, multiple desktop screens can be configured within the operating system executing on OMAP 4100 or host 200 and navigated using head-movement and/or speech commands. Each desktop can be configured to run a different application at the same time. For example a first desktop can be used to run the photo-viewing application which consumes the entire screen. To watch a movie, the user can issue a 'new desktop' spoken command and then select a movie viewing application from the new desktop. This then allows the movie viewing to take place in the current window. However the photo viewing application is still running but not visible. The user can switch to the photo viewing application by issuing a suitable command to switch viewable desktops ("Go to desktop 1"), or move around the open desktops by moving the head left, right, up, or down. The user is therefore able to quickly glance at all open desktops and their running applications.

It should be understood that one or more of the functions performed by HMD device 100 can also be implemented in other form factors, such as other types of hand-portable housings.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

The invention claimed is:

1. A hand-portable device comprising:
   a) a microdisplay, for displaying visual information received from a local processor;
   b) a motion detector, for detecting physical movement of a body part of a user, and to provide a motion or gesture input; and
   c) the local processor located in the hand-portable apparatus and further comprising:
   d) a transceiver, receiving the motion or gesture input from the motion detector;
   e) a translator, responsive to the transceiver and translating the received motion or gesture input to a user command;
   f) an icon information overlay generator, for (a) interrogating the status of a desktop to detect a displayed icon of an application program, for (b) determining overlay text or graphics associated with the displayed icon through consultation with a table, the table associating the displayed icon with the overlay text or graphics; and (c) generating on the desktop the determined overlay text or graphics associated with the displayed icon of the application program, the generated overlay text or graphics indicating one or more possible touch-free motion or gesture inputs for activating an action of the associated application program, the application program being exclusive from a calibration program; and
   g) a display controller, for forwarding information to be displayed on the microdisplay, including forwarding text content to be displayed at the information overlay.

2. The apparatus of claim 1 wherein the hand-portable device is a head mounted display (HMD) apparatus.

3. The apparatus of claim 1 wherein the information to be displayed further comprises a visual or audio confirmation of the local processor having processed the user command.

4. The apparatus of claim 1 further comprising:
   a) a wireless communication interface, for forwarding user commands to a host processor, and for receiving a reply from the host processor.

5. The apparatus of claim 2 wherein the motion detector is head-tracking circuitry or a camera for detecting the motion or gesture input, the motion or gesture input being a user's head tilt or hand motion, respectively.

6. The apparatus of claim 1 wherein the microdisplay is further configured to display visual information of the application program received from the local processor executing the application program; and a) wherein the icon information overlay generator is further configured to interface with the application program running on the local processor to generate the information overlay.

* * * * *